(12) United States Patent
Duermaier et al.

(10) Patent No.: US 11,181,084 B2
(45) Date of Patent: Nov. 23, 2021

(54) MOTORCYCLE INTAKE AIR GUIDE FOR A MOTORCYCLE INTERNAL COMBUSTION ENGINE

(71) Applicant: Bayerische Motoren Werke Aktiengesellschaft, Munich (DE)

(72) Inventors: Fritz Duermaier, Bruckberg (DE); Dieter Hable, Erding (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 16 days.

(21) Appl. No.: 16/286,830

(22) Filed: Feb. 27, 2019

(65) Prior Publication Data

US 2019/0195180 A1    Jun. 27, 2019

Related U.S. Application Data

(63) Continuation of application No. PCT/EP2017/078389, filed on Nov. 7, 2017.

(30) Foreign Application Priority Data

Nov. 16, 2016   (DE) ...................... 10 2016 222 441.7

(51) Int. Cl.
   *F02M 35/10*   (2006.01)
   *F02M 35/16*   (2006.01)
   (Continued)

(52) U.S. Cl.
   CPC ....... *F02M 35/10262* (2013.01); *B60K 13/02* (2013.01); *B62K 19/30* (2013.01);
   (Continued)

(58) Field of Classification Search
   CPC ....... F02M 35/10262; F02M 35/10013; F02M 35/10144; F02M 35/10255; F02M 35/162;
   (Continued)

(56) References Cited

U.S. PATENT DOCUMENTS 6,422,184 B1   7/2002   Kreuter
7,832,371 B2   11/2010  Fujita et al.
               (Continued)

FOREIGN PATENT DOCUMENTS

CN   1534178 A   10/2004
CN   1840416 A   10/2006
            (Continued)

OTHER PUBLICATIONS

International Search Report (PCT/ISA/210) issued in PCT Application No. PCT/EP2017/078389 dated Jan. 19, 2018 with English translation (five pages).

(Continued)

*Primary Examiner* — Joseph J Dallo
*Assistant Examiner* — Scott A Reinbold
(74) *Attorney, Agent, or Firm* — Crowell & Moring LLP

(57) ABSTRACT

A motorcycle intake air guide for feeding an intake air volumetric flow to a motorcycle internal combustion engine includes an unfiltered-air channel, a filtered-air channel, and an air filter therebetween. An intake air guide valve provided in the unfiltered-air channel is configured to change a cross-section of the unfiltered-air channel cross-section. The unfiltered-air channel has a double-flow design at least in sections with a first unfiltered-air partial channel and a second unfiltered-air partial channel which are merged downstream of a steering head of a frame of the motorcycle in a collection region of the unfiltered-air channel. The intake air guide valve is arranged in the collection region, downstream of the first and second unfiltered-air partial channels.

10 Claims, 2 Drawing Sheets

(51) Int. Cl.
*B62K 19/30* (2006.01)
*B60K 13/02* (2006.01)

(52) U.S. Cl.
CPC ............ *F02M 35/10013* (2013.01); *F02M 35/10144* (2013.01); *F02M 35/10255* (2013.01); *F02M 35/162* (2013.01); *B60Y 2200/12* (2013.01)

(58) Field of Classification Search
CPC .. F02M 35/10118; B62K 19/30; B60K 13/02; B60Y 2200/12; F02B 27/0278
USPC .................................................... 123/179.18
See application file for complete search history.

(56) References Cited

U.S. PATENT DOCUMENTS

| 2005/0150703 | A1* | 7/2005 | Nakagome ............... F02D 9/02 180/219 |
| 2006/0219201 | A1 | 10/2006 | Seki et al. |
| 2013/0306044 | A1 | 11/2013 | Tanaka |
| 2015/0136511 | A1 | 5/2015 | Kawata |

FOREIGN PATENT DOCUMENTS

| CN | 103422940 A | 12/2013 | |
| CN | 104653360 A | 5/2015 | |
| DE | 199 08 435 A1 | 9/2000 | |
| DE | 101 36 935 A1 | 2/2003 | |
| EP | 1 310 662 A2 | 5/2003 | |
| EP | 1 464 825 A2 | 10/2004 | |
| EP | 1 710 428 A1 | 10/2006 | |
| EP | 2 206 911 A1 | 7/2010 | |
| EP | 2 206 911 B1 | 2/2011 | |
| EP | 2206911 B1 * | 2/2011 | ......... F02M 35/1222 |
| JP | 2004-301024 A | 10/2004 | |
| JP | 2010-149806 A | 7/2010 | |

OTHER PUBLICATIONS

German-language Written Opinion (PCT/ISA/237) issued in PCT Application No. PCT/EP2017/078389 dated Jan. 19, 2018 (six pages).

German-language Office Action issued in counterpart German Application No. 10 2016 222 441.7 dated May 5, 2017 (six pages).

Chinese-language Office Action issued in Chinese Application No. 201780056442.X dated Jul. 30, 2020 with English translation (16 pages).

Japanese language Office Action issued in Japanese Application No. 2019-546983 dated Mar. 17, 2021 with English translation (11 pages).

\* cited by examiner

MOTORCYCLE INTAKE AIR GUIDE FOR A MOTORCYCLE INTERNAL COMBUSTION ENGINE

CROSS REFERENCE TO RELATED APPLICATIONS

This application is a continuation of PCT International Application No. PCT/EP2017/078389, filed Nov. 7, 2017, which claims priority under 35 U.S.C. § 119 from German Patent Application No. 10 2016 222 441.7, filed Nov. 16, 2016, the entire disclosures of which are herein expressly incorporated by reference.

BACKGROUND AND SUMMARY OF THE INVENTION

The invention relates to a motorcycle intake air guide for a motorcycle internal combustion engine. DE 10136935 A1 discloses an intake air guide in accordance with the preamble of the first patent claim.

The invention will be described below on the basis of the intake air guide for a motorcycle internal combustion engine, but this should not be interpreted as a limitation of the invention.

In a motorcycle internal combustion engine, it is not only the exhaust gas guide (exhaust pipe) which is a source of noise emissions, but the intake air guide can also give rise to noise emissions. A general development aim is to allow noise emissions only within a certain scope which is in part stipulated by law. Furthermore, the performance of the motorcycle internal combustion engine is limited in particular by the amount of air which can be fed into the combustion chambers, which therefore means that a small flow resistance for the intake air volumetric flow is sought.

A small flow resistance in the intake air guide can be achieved for example by a large duct cross section in this region. On the other hand, a relatively large duct cross section in the intake air guide causes relatively large noise emissions.

DE10136935 A1 proposes an intake air guide for an internal combustion engine with a reciprocating piston mode of design and having a valve device for changing the duct cross section of the intake air guide.

It is an object of the invention to specify a motorcycle intake air guide having improved controllability.

Within the context of the invention, a motorcycle intake air guide is to be understood as meaning a device for feeding air from the surroundings of a motorcycle into one or more combustion chambers of a motorcycle internal combustion engine. The motorcycle intake air guide is designed to feed an intake air volumetric flow, that is to say a volumetric flow made up of air, from the surroundings of a motorcycle to the motorcycle internal combustion engine. Fuel is burnt in the combustion chamber(s) of the motorcycle internal combustion engine while the intake volumetric flow is being fed in. The motorcycle internal combustion engine is to be understood as meaning a heat engine with internal combustion that has a reciprocating piston mode of design and can preferably be operated according to the Otto four-cycle principle.

The motorcycle intake air guide has, in particular, a raw-air duct, an air filter and a clean-air duct. The intake air volumetric flow can preferably be fed to the air filter by the raw-air duct. The raw-air duct is preferably of one-part design or preferably of multipart design. Furthermore, the raw-air duct is of multi-branch design at least in certain portions and has in certain portions a first raw-air subduct and a second raw-air subduct (two branches) which are designed in particular to respectively guide a portion of the intake air volumetric flow. The two raw-air subducts are preferably formed symmetrically to one another.

The air filter is designed for filtering the intake air volumetric flow. The intake air volumetric flow can flow through the air filter and, with further preference, the intake air volumetric flow, after it has flowed through the air filter, can be guided through the clean-air duct in the direction of the motorcycle internal combustion engine. With respect to the planned flow direction of the intake air volumetric flow from the surroundings to the motorcycle internal combustion engine, said flow first flows through the raw-air duct, then through the air filter and finally through the clean-air duct, with the result that the raw-air duct is arranged upstream of the air filter and the clean-air duct downstream of the air filter.

An intake air control valve is provided in the raw-air duct. The intake air control valve is designed to selectively change the cross-sectional area through which the intake air volumetric flow can flow.

The two raw-air subducts are merged in a collection region of the raw-air duct. The collection region is preferably adjoined, preferably directly, by the air filter. In particular, the air filter has an increased flow resistance by comparison with a cross-sectional area through which flow can pass freely; in order to keep the increase in the flow resistance low, the air filter has a large cross-sectional area through which flow can pass. The raw-air duct is thus widened in particular in the collection region in relation to its remaining course. The first and the second raw-air subduct open into the collection region of the raw-air duct, thus being merged in the collection region. Tests have shown that flow-calmed regions are formed in the collection region and that it is therefore particularly favorable for the intake air control valve to be arranged in this collection region and in particular in such a flow-calmed region. Particularly through this arrangement of the intake control valve in the collection region, preferably in a flow-calmed zone, there results a particularly small flow resistance for the intake air guide and thus an improved intake air guide can be realized.

In a preferred embodiment of the invention, the intake air guide valve has a first and a second intake air control element, and, with further preference, the intake air guide valve has further intake air control elements. Particularly for controlling the intake air volumetric flow, preferably for controlling the size of the intake air volumetric flow, these intake air control elements can be moved back and forth between an opened and a closed position. These intake air control elements are preferably designed as rotatable control rollers and preferably as, in particular pivotable, intake air control flaps. In the closed position of one or both of the intake air control elements, the cross-sectional area in the raw-air duct through which the intake air volumetric flow can flow is reduced by comparison with the cross-sectional area through which the intake air volumetric flow can flow in the opened state. The two intake air control elements can preferably be controlled separately from one another and they can preferably be controlled synchronously to one another. Particularly by designing the intake air guide valve with a plurality of intake air control elements, it is possible to achieve a particularly good controllability and in particular also a quick reaction time of the intake air guide valve.

In a preferred embodiment of the invention, the first raw-air subduct can be blocked off, at least partially, by a first intake air control element, preferably an intake air control flap. With further preference, the second raw-air subduct can be blocked off, at least partially, by a second intake air control element, preferably an intake air control flap. Here, these intake air control elements can, as stated, be moved between a closed and an opened position and it is thus possible for this at least partial blocking-off to occur selectively. Particularly by directly blocking off the raw-air subducts or at least one of these raw-air subducts, it is possible to achieve a particularly good controllability of the motorcycle intake air guide.

In a preferred embodiment of the invention, the raw-air duct has a raw-air bypass duct which is designed to guide a raw-air bypass volumetric flow past the intake air guide valve. The raw-air bypass volumetric flow is in particular a partial volumetric flow of the intake air volumetric flow. It is ensured in particular by the raw-air bypass duct that a defined partial volumetric flow of the intake air volumetric flow can flow through the motorcycle intake air guide uninfluenced by the intake air guide valve and thus, on the one hand, the intake air guide valve can be designed to be smaller and there remains a partial volumetric flow for an emergency operation should the intake air guide valve fail.

The raw-air duct preferably has two raw-air bypass ducts. These two raw-air bypass ducts are preferably arranged in such a way that a respective intake air control element can be completely bypassed by one of the raw-air bypass ducts, each intake air control element preferably being assigned a dedicated raw-air bypass duct. A particularly reliable operation of the motorcycle intake air guide can be realized particularly by a plurality of raw-air bypass ducts.

In a preferred embodiment of the invention, an imaginary spacing plane intersects the two raw-air subducts. In particular, this spacing plane is oriented orthogonally to a flow direction in one of the two raw-air subducts. The cross sections of the raw-air subducts which result from the sectioning thereof with the spacing plane are situated in an envelope area in the spacing plane. Here, the envelope area is a single area which envelops these two cross sections of the raw-air subducts and also the area situated between these cross sections. This surface area situated between the two cross sections of the raw-air subducts is to be understood as meaning a so-called blocking area. Figuratively speaking, this blocking area is obtained as the area in the spacing plane that is situated outside the raw-air subducts and is partially delimited by them.

The raw-air duct extends, in particular in the collection region and preferably further downstream, along an imaginary duct generating line. The duct generating line is preferably to be understood as a three-dimensionally extending line which extends in particular in each case through a centroid of a cross-sectional area of the raw-air duct, wherein the cross-sectional area is preferably oriented orthogonally to the flow direction of the intake air volumetric flow. Preferably, at least one of the intake air control elements and preferably both intake air control elements, in their completely opened position, is/are arranged, at least partially or preferably completely, within the projection of the blocking area along the duct generating line. The intake air control elements are preferably arranged to an extent of 40% or more, preferably to an extent of 60% or more, and particularly preferably to an extent of 80% or more, within the projection of the blocking area along the duct generating line.

Particularly by virtue of such an arrangement, the intake air control element(s) is or are arranged downstream of the blocking area, and tests have shown that a flow-calmed zone, in colloquial language a slipstream, is formed in the described region and the intake air control elements can advantageously be positioned here. In this context, a flow-calmed zone is to be understood as meaning a region of the raw-air duct, downstream of its two- or multi-branch configuration, which is only slightly impinged, if at all, by the intake air volumetric flow. Figuratively speaking, the intake air control elements, in particular as a result of the proposed positioning, are thus situated in a slipstream and thus cause a small flow resistance, if any, in their opened position.

There is provision for the above-proposed motorcycle intake air guide to be fastened to a motorcycle frame. The motorcycle intake air guide is preferably arranged on the motorcycle frame in such a way that the first raw-air subduct and the second raw-air subduct at least partially enclose a steering head region of the motorcycle frame.

The steering head region of the motorcycle frame is to be understood as meaning a region of this frame which is designed for rotatably receiving a motorcycle front wheel fork. In relation to straight-ahead driving, one of the two raw-air subducts extends on the left side of the steering head region and the other of the two raw-air subducts extends on the right side of the steering head region. For routing the two raw-air subducts, the motorcycle frame preferably has a respective clearance which is routed through the motorcycle frame on the left or on the right side of the steering head region. A particularly small installation space requirement can be achieved in particular by such a configuration of the motorcycle frame with the proposed motorcycle intake air guide.

In a preferred embodiment of the invention, a duct inner wall of at least one of the two raw-air subducts, preferably of both raw-air subducts, is formed by an outer surface of the steering head region. Here, this duct inner wall can be contacted by the respective raw-air subduct volumetric flow when flowing through the raw-air subduct. A particularly large cross section through which flow can pass in the region of the raw-air subducts can be achieved in particular by such a configuration.

In a preferred embodiment of the invention, the spacing plane intersects the steering head region. The blocking area is preferably obtained as a cross-sectional area of this steering head region in the spacing plane. A particularly operationally reliable motorcycle intake air guide can be realized particularly by such a configuration.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
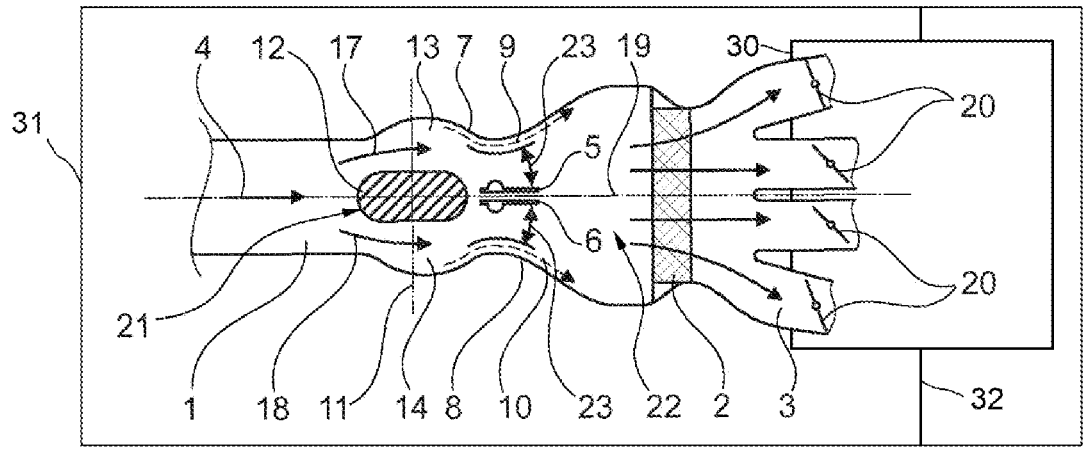
FIG. 1 shows a sectional illustration of a motorcycle intake air feed in accordance with an embodiment of the present invention.

A section through a motorcycle intake air guide of motorcycle 31 is illustrated in a plan view in FIG. 1. The intake air volumetric flow 4 is fed via the raw-air duct 1 to the air filter 2, which cleans the intake air volumetric flow 4 as it flows through. Downstream of the air filter 2, the intake air volumetric flow 4 passes into the clean-air duct 3. In the clean-air duct 3 there are provided throttle valves 20 by which the power output of the motorcycle internal combustion engine 30 can be controlled.

The raw-air duct 1 is of two-branch design in certain portions and has a first raw-air subduct 13 and a second raw-air subduct 14. The two raw-air subducts 13, 14 are designed to guide a first raw-air volumetric flow 17 and a second raw-air volumetric flow 18 around the steering head region 12 of the motorcycle frame 32. The motorcycle front wheel fork (not shown) is rotatably mounted in the steering head region 12. The outer surface 21 of the steering head region 12 forms the duct inner wall in that subregion in which the raw-air duct 1 is of two-branch design. By virtue of this design, said outer surface 21 can be directly contacted by the raw-air partial volumetric flows 17, 18.

Furthermore, the raw-air duct 1 has a first raw-air bypass duct 7 and a second raw-air bypass duct 8. A bypass volumetric flow 9, 10 flows past the intake air guide valve 22 through each of the raw-air bypass ducts 7, 8.

The two raw-air bypass ducts 7, 8 make it possible for a respective partial volumetric flow 9, 10 to be branched off from the intake air volumetric flow 4 or from the raw-air partial volumetric flows 17, 18 and to be guided around the intake air guide valve 22 with the intake air flaps 5, 6.

The intake air flaps 5, 6 can be moved back and forth in the arrow direction 23 and can thus be transferred from a closed into an opened position, and vice versa. The intake air flaps 5, 6 are illustrated in the completely opened position. Pivoting the intake air flaps 5, 6 in the direction 23 makes it possible to change the cross-sectional area of the raw-air duct 1 through which the intake air volumetric flow 4 can flow in the region of the intake air guide valve 22.

The raw-air duct 4 extends along the duct generating line 19, this being illustrated as a dash double-dot line. The raw-air duct 1 is sectioned by the imaginary spacing plane 11 in its two-branch region. Here, the spacing plane 11 is arranged at the widest point of the steering head region 12 and orthogonally to the flow direction 18 of the partial volumetric flow in the second raw-air subduct 14.

Figure 2:
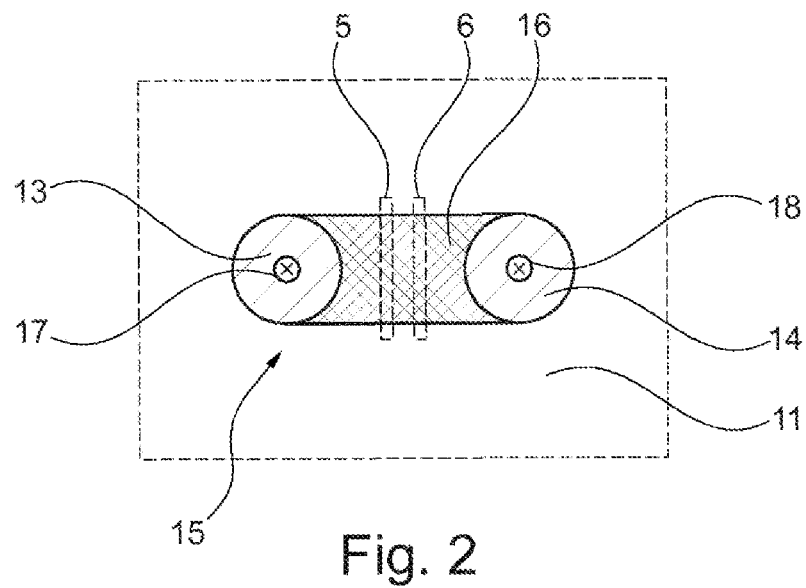
FIG. 2 shows a view of a spacing plane in the FIG. 1 intake air feed.

FIG. 2 illustrates a view of the spacing plane 11. Here, the cross sections of the raw-air subducts 13, 14 are shown in this illustration as a circular cross section. This circular cross section is to be understood as an example and can deviate from this form in other embodiments, in particular if the steering head region forms a part of the duct wall of the raw-air subducts 13, 14.

The raw-air subducts 13, 14 are designed for guiding the raw-air partial volumetric flows 17, 18. Both the cross sections of the raw-air subducts 13, 14 and the area 16 extending between them are encompassed in the spacing plane 11 by the envelope area 15.

The region 16 of the envelope area 15 that is illustrated in cross-hatching is the so-called blocking area 16. By virtue of this blocking area 16, there is no flow at all of the intake air volumetric flow which is guided in the raw-air duct. As can be seen, the intake air flaps 5, 6 are situated to a large part within the projection of the blocking area 16 and thus in the slipstream of the steering head region. Particularly by this configuration, it is made possible that the intake air volumetric flow can be controlled by the intake air flaps and additionally the latter, in their opened position, cause virtually no flow resistance since they are not impinged in this position by the intake air volumetric flow.

Figure 3:
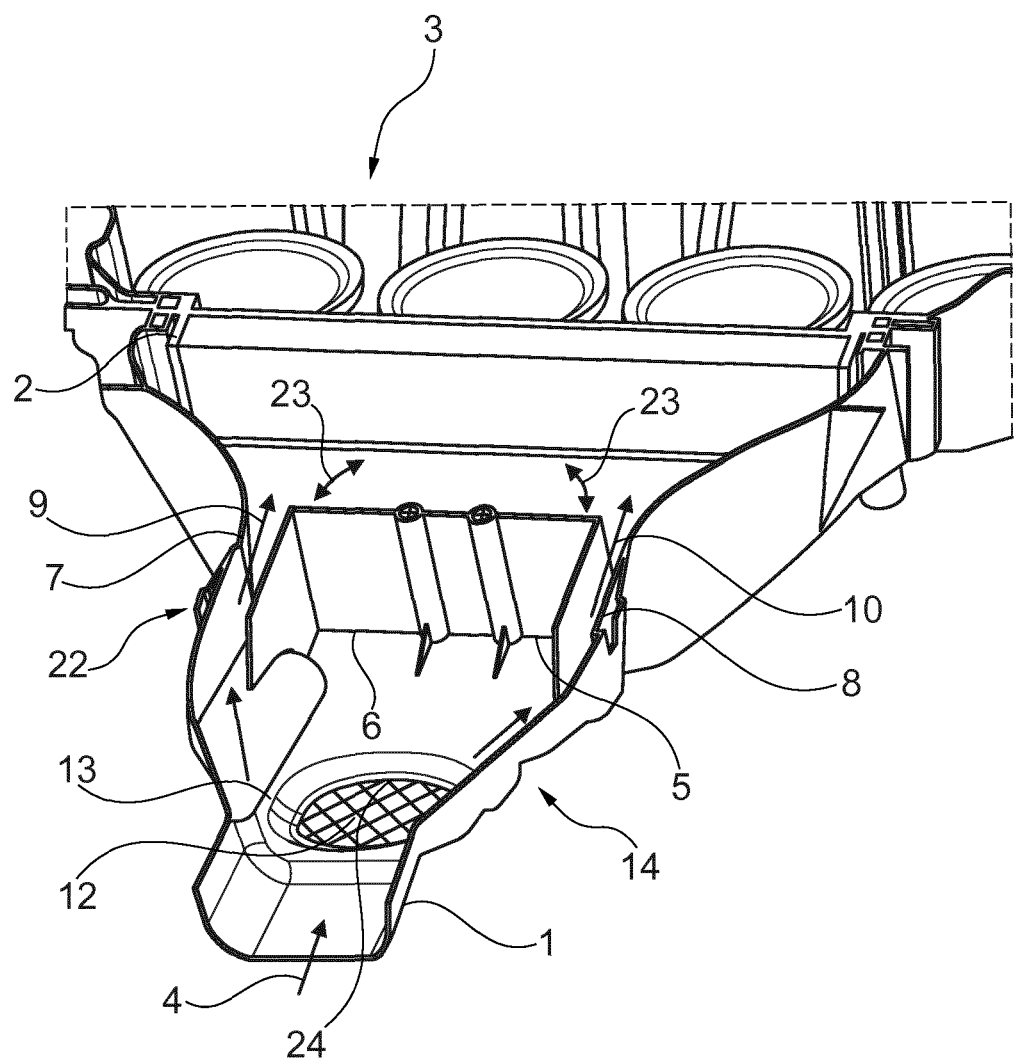
FIG. 3 shows a perspective sectional illustration of the FIG. 1 motorcycle intake air feed.

FIG. 3 shows the motorcycle intake air guide in perspective in a sectional illustration. The intake air volumetric flow 4 enters the motorcycle intake air guide via the raw-air duct 1. The motorcycle intake air guide is arranged on the motorcycle frame in the steering head region 12. In this region 12, the raw-air duct is subdivided into two branches and bypasses said region. The outer surface of the steering head of the motorcycle frame (not shown) in this case forms in each case the inner duct wall (not shown) of the raw-air subducts 13, 14. The raw-air duct 1 is sealed with respect to the motorcycle frame (not shown) by the sealing lip 24, with the result that no air can escape between motorcycle frame and raw-air duct.

The intake air flaps 5, 6 of the intake air guide valve 22 are shown in their completely closed position in FIG. 3. To change their position and thus the blocking action, the intake air flaps 5, 6 can each be pivoted in the direction 23. In the closed position, the noise emission via the motorcycle intake air guide is reduced by comparison with the noise emission in the opened position. The intake air volumetric flow 4 is divided between the raw-air bypass ducts 7, 8 and flows past the closed intake air flaps 5, 6 as bypass volumetric flows 9, 10 to the air filter 2. The intake air volumetric flow 4 is cleaned by the air filter 2 when flowing through and is fed via the clean-air duct 3 to the motorcycle internal combustion engine (not shown).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motorcycle intake air guide for feeding an intake air volumetric flow to a motorcycle internal combustion engine, comprising:
    a raw-air duct;
    a clean-air duct;
    an intake air guide valve arranged in the raw air duct; and
    an air filter,
    wherein
        the raw-air duct is arranged upstream of the air filter in a flow direction of the intake air volumetric flow,
        the clean-air duct is arranged downstream of the air filter
        the intake air guide valve is configured to be movable to change a cross-sectional area of the raw-air duct,
        the raw-air duct includes a first raw-air subduct and a second raw-air subduct arranged in parallel in the flow direction of the intake air volumetric flow, the first and second raw-air subducts being configured to split the raw-air duct into parallel flow paths in a region of the raw-air duct alongside a steering head region,
        the intake air volumetric flow emerging from the first and second raw-air subducts is merged downstream in a collection region of the raw-air duct,
        the intake air guide valve is arranged in the collection region, downstream of the first and second raw-air subducts, and
        the air intake valve includes a first and a second intake air control element, each air control element being movable between an open and a closed position,
        the first and second intake air control elements have pivot axes aligned vertically transverse to the flow direction and located laterally centrally in the collection region,
        when in the open position the first and second intake air control elements are aligned parallel to the flow direction such that a flow resistance to the intake air volumetric flow from the first and second air control elements is decreased relative to a flow resistance in the closed position and the first and second air control elements provide axially-aligned flow stabilizing surfaces configured to minimize cross-flow in the collection region during merging of the volumetric flow downstream of the first and second raw-air subducts, a first raw-air bypass duct and a second raw-air bypass duct are arranged in the raw-air duct, laterally outward of the intake air guide valve, and in the volumetric flow downstream of the first and second raw-air subducts, such that raw air in the raw-air duct entering from the first and second raw-air subducts is passable to the air filter when the intake air guide valve is in the closed position.

2. The motorcycle intake air guide as claimed in claim 1, wherein
the cross-sectional area of the raw-air duct when the first and a second intake air control elements are in the closed position is smaller than the cross-sectional area of the raw-air duct when the first and a second intake air control elements in the are opened position.

3. The motorcycle intake air guide as claimed in claim 2, wherein
the first intake air control element is configured to at least partially block the intake air volumetric flow emerging from the first raw-air subduct, and the second intake air control element is configured to at least partially blocked the intake air volumetric flow emerging from the second raw-air subduct.

4. The motorcycle intake air guide as claimed in claim 1, wherein
in a spacing plane orthogonal to the flow direction which intersects the first and second raw-air subducts, an envelope area includes cross sections of the first and second raw-air subducts and a region between the first and second raw-air subducts,
a region of the envelope area between the first and second raw-air subducts is a blocking area upstream of the first and second the intake air control elements, and
when the first and second intake air control elements are completely opened, the first and second the intake air control elements are at least partially within a projection of the blocking area downstream along a centerline of the raw-air duct.

5. A motorcycle frame, comprising:
a steering head region; and
a motorcycle intake air guide configured to feed an intake air volumetric flow to a motorcycle internal combustion engine, including
a raw-air duct,
a clean-air duct,
an intake air guide valve arranged in the raw air duct, and
an air filter,
wherein
the raw-air duct is arranged upstream of the air filter in a flow direction of the intake air volumetric flow,
the clean-air duct is arranged downstream of the air filter
the intake air guide valve is configured to be movable to change a cross-sectional area of the raw-air duct,
the raw-air duct includes a first raw-air subduct and a second raw-air subduct arranged in parallel in the flow direction of the intake air volumetric flow, the first and second raw-air subducts being configured to split the raw-air duct into parallel flow paths in a region of the raw-air duct alongside a steering head region, the intake air volumetric flow emerging from the first and second raw-air subducts is merged downstream in a collection region of the raw-air duct, and the intake air guide valve is arranged in the collection region, downstream of the first and second raw-air subducts, the air intake valve includes a first and a second intake air control element, each air control element being movable between an open and a closed position, the first and second intake air control elements have pivot axes aligned vertically transverse to the flow direction and located laterally centrally in the collection region, when in the open position the first and second intake air control elements are aligned parallel to the flow direction such that a flow resistance to the intake air volumetric flow from the first and second air control elements is decreased relative to a flow resistance in the closed position and the first and second air control elements provide axially-aligned flow stabilizing surfaces configured to minimize cross-flow in the collection region during merging of the volumetric flow downstream of the first and second raw-air subducts, a first raw-air bypass duct and a second raw-air bypass duct are arranged in the raw-air duct, laterally outward of the intake air guide valve, and in the volumetric flow downstream of the first and second raw-air subducts, such that raw air in the raw-air duct entering from the first and second raw-air subducts is passable to the air filter when the intake air guide valve is in the closed position, and the motorcycle intake air guide is configured to be arranged on the motorcycle frame such that the first raw-air subduct and the second raw-air subduct at least partially enclose the steering head region which extends through the motorcycle air intake guide between the first and second raw-air subducts.

6. The motorcycle frame as claimed in claim 5, wherein
in a spacing plane orthogonal to the flow direction which intersects the first and second raw-air subducts, an envelope area includes cross sections of the first and second raw-air subducts and a region between the first and second raw-air subducts,
a region of the envelope area between the first and second raw-air subducts is a blocking area upstream of the first and second the intake air control elements, and
when the first and second intake air control elements are completely opened, the first and second the intake air control elements are at least partially within a projection of the blocking area downstream along a centerline of the raw-air duct.

7. The motorcycle frame as claimed in claim 6, wherein an outer surface of the steering head region forms a duct inner wall of at least one of the first and second raw-air subducts.

8. The motorcycle frame as claimed in claim 6, wherein the spacing plane intersects the steering head region, and the blocking area is formed by a cross-sectional area of the steering head region in the spacing plane.

9. The motorcycle frame as claimed in claim 4, wherein the spacing plane intersects the steering head region, and the blocking area is formed by a cross-sectional area of the steering head region in the spacing plane.

10. A motorcycle, comprising:
a motorcycle frame, having a steering head region; and
a motorcycle intake air guide configured to feed an intake air volumetric flow to a motorcycle internal combustion engine, including
a raw-air duct,
a clean-air duct,
an intake air guide valve arranged in the raw air duct, and
an air filter,
wherein
the raw-air duct is arranged upstream of the air filter in a flow direction of the intake air volumetric flow,
the clean-air duct is arranged downstream of the air filter
the intake air guide valve is configured to be movable to change a cross-sectional area of the raw-air duct,
the raw-air duct includes a first raw-air subduct and a second raw-air subduct arranged in parallel in the flow direction of the intake air volumetric flow, the first and second raw-air subducts being configured to split the raw-air duct into parallel flow paths in a region of the raw-air duct alongside a steering head region,
the intake air volumetric flow emerging from the first and second raw-air subducts is merged downstream in a collection region of the raw-air duct, and
the intake air guide valve is arranged in the collection region, downstream of the first and second raw-air subducts,
the air intake valve includes a first and a second intake air control element, each air control element being movable between an open and a closed position,
the first and second intake air control elements have pivot axes aligned vertically transverse to the flow direction and located laterally centrally in the collection region,
when in the open position the first and second intake air control elements are aligned parallel to the flow direction such that a flow resistance to the intake air volumetric flow from the first and second air control elements is decreased relative to a flow resistance in the closed position and the first and second air control elements provide axially-aligned flow stabilizing surfaces configured to minimize cross-flow in the collection region during merging of the volumetric flow downstream of the first and second raw-air subducts,
a first raw-air bypass duct and a second raw-air bypass duct are arranged in the raw-air duct, laterally outward of the intake air guide valve, and in the volumetric flow downstream of the first and second raw-air subducts, such that raw air in the raw-air duct entering from the first and second raw-air subducts is passable to the air filter when the intake air guide valve is in the closed position, and
the motorcycle intake air guide is configured to be arranged on the motorcycle frame such that the first raw-air subduct and the second raw-air subduct at least partially enclose the steering head region which extends through the motorcycle air intake guide between the first and second raw-air subducts.

* * * * *